(12) United States Patent
Monahan et al.

(10) Patent No.: US 8,078,182 B2
(45) Date of Patent: Dec. 13, 2011

(54) METHOD AND SYSTEM FOR COMMUNICATING USER INTERFACES BETWEEN FIRST AND SECOND USERS OVER A NETWORK

(75) Inventors: Jay Monahan, Campbell, CA (US); Bradley A. Handler, Menlo Park, CA (US)

(73) Assignee: eBay Inc., San Jose, CA (US)

(*) Notice: Subject to any disclaimer, the term of this patent is extended or adjusted under 35 U.S.C. 154(b) by 848 days.

(21) Appl. No.: 11/965,538

(22) Filed: Dec. 27, 2007

(65) Prior Publication Data

US 2008/0104518 A1    May 1, 2008

Related U.S. Application Data

(63) Continuation of application No. 10/316,628, filed on Dec. 10, 2002, now Pat. No. 7,509,323, which is a continuation of application No. 09/668,399, filed on Sep. 22, 2000, now Pat. No. 6,523,037.

(51) Int. Cl.
  *H04W 88/02* (2009.01)

(52) U.S. Cl. ........................ 455/446; 455/566

(58) Field of Classification Search .................. 455/446, 455/566; 379/93.17; 715/736, 744; 709/203, 709/206, 213, 207, 224, 249; 704/500; 707/610, 707/780, 607, 694, 705, 709, 792, 802
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,412,287 A | 10/1983 | Braddock, III | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,823,265 A | 4/1989 | Nelson | |
| 4,864,516 A | 9/1989 | Gaither et al. | |
| 4,903,201 A | 2/1990 | Wagner | |

(Continued)

FOREIGN PATENT DOCUMENTS

CA    2253543    3/1997

(Continued)

OTHER PUBLICATIONS

"U.S. Appl. No. 09/668,339, Non-Final Office Action mailed Jun. 4, 2002", 5 pgs.

(Continued)

*Primary Examiner* — Diane Mizrahl
(74) *Attorney, Agent, or Firm* — Schwegman, Lundberg & Woessner, P.A.

(57) ABSTRACT

A system generates a first user interface that includes a first plurality of items respectively associated with a first plurality of selection functions. Next, the system presents the first user interface to a first user over a communications network. Next, the system receives a first plurality of selections from the first user of a second plurality of items. The second plurality of items have been selected from the first plurality of items by the first user using the first plurality of selection functions. Next, the system generates a second user interface that includes the second plurality of items. The second plurality of items are respectively associated with a second plurality of selection functions. Finally, the system presents the second user interface to the second user.

11 Claims, 15 Drawing Sheets

U.S. PATENT DOCUMENTS

| | | | |
|---|---|---|---|
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,553,145 A | 9/1996 | Micali |
| 5,557,728 A | 9/1996 | Garrett et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,724,567 A | 3/1998 | Rose et al. |
| 5,724,576 A | 3/1998 | Letourneau |
| 5,727,165 A | 3/1998 | Ordish et al. |
| 5,771,291 A | 6/1998 | Newton et al. |
| 5,771,380 A | 6/1998 | Tanaka et al. |
| 5,790,790 A | 8/1998 | Smith et al. |
| 5,793,497 A | 8/1998 | Funk |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,857,188 A | 1/1999 | Douglas |
| 5,857,201 A | 1/1999 | Wright, Jr. et al. |
| 5,857,203 A | 1/1999 | Kauffman et al. |
| 5,872,848 A | 2/1999 | Romney et al. |
| 5,873,069 A | 2/1999 | Reuhl et al. |
| 5,874,412 A | 2/1999 | Priebe et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,922,074 A | 7/1999 | Richard et al. |
| 5,924,072 A | 7/1999 | Havens |
| 5,926,794 A | 7/1999 | Fethe |
| 5,960,406 A | 9/1999 | Rasansky et al. |
| 5,991,739 A | 11/1999 | Cupps et al. |
| 6,005,565 A | 12/1999 | Legall et al. |
| 6,035,402 A | 3/2000 | Vaeth et al. |
| 6,044,363 A | 3/2000 | Mori et al. |
| 6,047,264 A | 4/2000 | Fisher et al. |
| 6,055,518 A | 4/2000 | Franklin et al. |
| 6,058,417 A | 5/2000 | Hess et al. |
| 6,061,448 A | 5/2000 | Smith et al. |
| 6,073,117 A | 6/2000 | Oyanagi et al. |
| 6,085,176 A | 7/2000 | Woolston |
| 6,104,815 A | 8/2000 | Alcorn et al. |
| 6,119,137 A | 9/2000 | Smith et al. |
| 6,157,935 A | 12/2000 | Tran et al. |
| 6,161,082 A | 12/2000 | Goldberg et al. |
| 6,178,408 B1 | 1/2001 | Copple et al. |
| 6,192,407 B1 | 2/2001 | Smith et al. |
| 6,202,051 B1 | 3/2001 | Woolston |
| 6,243,691 B1 | 6/2001 | Fisher et al. |
| 6,278,993 B1 | 8/2001 | Kumar et al. |
| 6,345,288 B1 | 2/2002 | Reed et al. |
| 6,539,396 B1 * | 3/2003 | Bowman-Amuah ......... 707/769 |
| 6,636,242 B2 * | 10/2003 | Bowman-Amuah ......... 715/764 |
| 6,732,145 B1 | 5/2004 | Aravamudan et al. |
| 7,130,885 B2 * | 10/2006 | Chandra et al. ............ 709/206 |
| 7,509,323 B2 | 3/2009 | Monahan et al. |
| 2001/0027439 A1 | 10/2001 | Holtzman et al. |
| 2001/0029463 A1 | 10/2001 | Fuller |
| 2001/0034739 A1 | 10/2001 | Anecki et al. |
| 2001/0034849 A1 | 10/2001 | Powers |
| 2002/0138582 A1 * | 9/2002 | Chandra et al. ............ 709/206 |
| 2004/0153378 A1 * | 8/2004 | Perkowski .................. 705/27 |
| 2008/0320049 A1 * | 12/2008 | Levy et al. ............... 707/104.1 |

FOREIGN PATENT DOCUMENTS

| | | |
|---|---|---|
| FR | 2658635 | 8/1991 |
| NL | 9300266 | 2/1993 |
| WO | WO-9215174 A1 | 9/1992 |
| WO | WO-9517711 A1 | 6/1995 |
| WO | WO-9634356 A1 | 10/1996 |
| WO | WO-9737315 A1 | 10/1997 |
| WO | WO-9963461 A1 | 12/1999 |
| WO | WO-0225401 A3 | 3/2002 |

OTHER PUBLICATIONS

"U.S. Appl. No. 09/668,339, Notice of Allowance mailed Oct. 15, 2002", 4 pgs.

"U.S. Appl. No. 09/668,339, Response filed Sep. 24, 2002 to Non-Final Office Action mailed Jun. 4, 2002", 22 pgs.

"U.S. Appl. No. 10/316,628, Response filed Sep. 24, 2007 to Non-Final Office Action mailed May 22, 2007", 9 pgs.

"Improving Search Engine Results through User Feedback", *Research Disclosure*, 458 (105), IBM Corp.,(Jun. 2002),458105.

"International Application Serial No. 01973138.9, European Search Report mailed Jun. 27, 2005", 4 pgs.

"International Application Serial No. 2001292747, Examiner's Report mailed Sep. 9, 2005", 2 pgs.

"International Application Serial No. 2006201638, First Examiner's Report mailed Feb. 1, 2008", 1 pg.

"International Search Report, for Application No. PCT/US01/29149, date Mailed Dec. 5, 2001".

"Onsale joins fray as online shopping picks up speed: Internet Booms", *Computer Reseller News*, (Jun. 5, 1995),1 pg.

"Onsale: Onsale Brings Thrill of Auctions and Bargain Hunting Online; Unique Internet retail service debuts with week-long charity auction for The Computer Museum in Boston", *Business Wire*, Dialog Web. 0489267 BW0022, (May 24, 1995),3 pages.

"PCT Written Opinion, for Application No. PCT/US01/29149, date mailed Jan. 31, 2003", 9 Pages.

"Personal Optimized Decision/Transaction Program", *IBM Technical Disclosure Bulletin;* vol. 38(1), USA, (Jan. 1995),83-84.

"Saving Search Results in an HTML-Based Information Center", *Research Disclosure*, 449 (148), IBM Corp., (Sep. 2001),449148.

Baeza-Yates, R. , et al., "Modern Information Retrieval", *Chapter 5: Query Operation*, (1999), 117-139.

Clemons, E , "Evaluating the prospects for alternative electronic securities", *Proceedings of ICIS 91: 12th International Conference on Information Systems*, (Dec. 16-18, 1991),53-61.

Davison, A. , "Coding with HTML Forms", *Dr. Dobbs Journal*, 20 (6), (Jun. 1, 1995), 70, 72-75, 106.

Hauser, R , "Anonymous Delivery of Goods in Electrical Commerce", *IBM Technical Disclosure Bulletin*, 39(3), (Mar. 1996),363-366.

Hess, C M., et al., "Computerized Loan Organization System; An Industry Case Study of the Electronic Marks Hypothesis", *MIS Quarterly*, vol. 18(3), (Sep. 1994),251-274.

Lee, H. G., "Electronic breokerage and electronic auction: the impact of IT on market structures", *Proceedings of the Twenty-Ninth Hawaii International Conference on System Sciences*, vol. 4, (1996),397-406.

Malone, Thomas W., "Electronic Markets and Electronic Hierarchies", *Communications of the ACM*, 30(6), (Jun. 1987),484-497.

Mardesich, J , "Onsale Takes Auction gavel electronic", *Computer Reseller News*, Mountain View, California,(Jul. 8, 1996), p. 2 continued on p. 32.

Massimb, Marcel , "Electronic Trading, Market Structure and Liquidity", *Financial Analysts Journal*, 50(1), (Jan./Feb. 1994),39-50.

Meade, J. , "Visual 360: A Performance Appraisal System That's 'Fun'", *HR Magazine*, Society for Human Resource Management.,(Jul. 1999),44, 7, 2 pgs.

Neo, B S., "The implementation of an electronic market for pig trading in Singapore", *Journal of Strategic Information Systems;* vol. 1(5), (Dec. 1992),278-288.

Pitkow, J. E., et al., "Using the Web as a Survey Tool: Results from the Second WWW User Survey", *Computer Networks and ISDN Systems*, 27 (6), (1995),809-822.

Post, D L., "Application of auctions as a pricing mechanism for the interchange of electric power", *IEEE Transactions on Power Systems*, 10(3), (Aug. 1995),1580-1584.

Priest, Chris , "Adaptive Agents in a Persistent Shout Double Auction", *International Conference on Information and Computation Economies, Proceedings of the first international conference on Information and computation economies*, (1999),11-18.

Reck, Martin , "Formally Specifying and Automated Trade Execution System", *Journal of Systems and Software;* vol. 21, Elsevier Science Publishing Co., Inc. New York, NY, (Jun. 1993),245-252.

Resnick, Paul , "Reputation systems", *Communications of the ACM*, 43(12), (Dec. 2000),45-48.

Rockoff, T E., et al., "Design of an Internet-based system for remote Dutch auctions", *Internet Research: Electronic Networking Applications and Policy*, vol. 5(4), (Jan. 1, 1995),10-16.

Salton, G. , et al., "Improving Retrieval Performance by Relevance Feedback", *Journal of American Society for Information Science*, 41 (4), (Jun. 4, 1990),288-297.

Schmid, B F., "The Development of Electronic Commerce", *Newsletter of the Competence Centre Electronic Markets*, No. 9/10, (Oct. 1993),2 pgs.

Siegman, Ken , "Nowhere to go but up", *PC Week;* vol. 12(42), Ziff-Davis Publishing Company, (Oct. 23, 1995),1-3.

Van Heck, E. , "Experiences Electronic Auctions in the Dutch Flower Industry", *Focus Theme, EM—Electronic Markets*, 7(4), (1997),29-34.

Warbelow, A , et al., "Aucnet: TV Auction Network System", *Harvard Business School Case/Study*, HBVR#9-190-001, USA, (Jul. 1989),1-15.

Zwass, Vladimir , "Electronic Commerce: Structures and Issues", *International Journal of Electronic Commerce*, vol. 1(1), (Fall 1996),3-23.

"U.S. Appl. No. 10/316,628, Notice of Allowance mailed Nov. 6, 2008", 15 pgs.

"U.S. Appl. No. 10/316,628, Examiner Interview Summary mailed Dec. 8, 2008", 4 pgs.

"U.S. Appl. No. 10/316,628, Non Final Office Action mailed May 22, 2007", 8 pgs.

"U.S. Appl. No. 10/316,628, Non Final Office Action mailed Dec. 6, 2005", 7 pgs.

"U.S. Appl. No. 10/316,628, Response filed Jan. 29, 2009 to Notice of Allowance mailed Nov. 6, 2008", 8 pgs.

"U.S. Appl. No. 10/316,628, Response filed Aug. 14, 2006 to Non Final Office Action mailed Dec. 6, 2005", 4 pgs.

"Australian Application Serial No. 2006201638, Examiner Report Mailed Dec. 1, 2008", 2 pgs.

"Email This to a Friend: Time Running Out on Kid Email", *Wired News*, [Online]. Retrieved from the Internet: http://web.archive.org/web/20000617014347/http://www.wired.com/news/mailform/1,1460,34453,00>, (Jun. 17, 2000), 1 pg.

"Japanese Application Serial No. 2002-529338 Office Action mailed on Jun. 2, 2009", 3 pgs.

"Prima Tech Ships Online Auctions at eBay: Bid with Confidence, Sell with Success; Bestseller on Media Sensation eBay Updated", *Business Wire*, [Online]. Retrieved from the Internet: http://findarticles.com/p/articles/mi_m0EIN/is_1999_Sept_24/ai_55854131/?tag=content;col. 1, (Sep. 24, 1999), 2 pgs.

"QuickStart Guide", *WebSPIRS 4.1 Quick Start Guide. SilverPlatter*, (1999), 19 pgs.

"WebSPIRS 4.0 Arrives", *NCSU Newsletter* vol. 26 No. 10, [Online]. Retrieved from the Internet: http://www.lib.ncsu.edu/publications/NLarchives/NL.vol.26/NL.26.10.pdf, (May 1999), 1 pg.

"WebSPIRS Adnimistrator's Guide", *SilverPlatter Version 4.1*, (Jul. 1999), 98 pgs.

"WebSPIRS v4.1 from SilverPlatter Now in General Release", [Online]. Retrieved from the Internet: http://web.archive.org/web/20000817223512/www.silverplatter.com/press/WebSPIRS_V4.1, (Nov. 22, 1999), 2 pgs.

"WebSPIRS: Mail Records", [Online]. Retrieved from the Internet: http://158.132.160.214/webspirs/doc/mail.>, 1 pg.

"U.S. Appl. No. 11/965,538, Non Office Action mailed Jan. 18, 2011", 11 pgs.

Klein, Stefan , "Introduction to Electronic Auctions", *Focus Theme*, vol. 7, No. 4 (1997),1-4.

Lee, Ho G., "AUCNET: Electronic Intermediary for Used-Car Transactions", *Focus Theme, Electronic Markets*, vol. 7, No. 4, (1997),24-28.

Reck, M. , "Formally Specifying an Automated Trade Execution System", *The Journal of Systems and Software*, 1993, Elsevier Science Publishing, USA,(1993),245-252.

Turban, Efraim , "Auctions and Bidding on the Internet: An Assessment", *Focus Theme, EM—Electronic Markets*, vol. 7, No. 4, (1997),7-11.

Graham, I, "The Emergence of Linked Fish Markets in Europe", Focus Theme, 1-4 (1998).

Tjostheim, Ingvar, et al., "A case study of an on-line auction for the World Wide Web", Norwegian Computing Center (NR) http://www.nr.no/~ingyar/enter98.html, 1-10 (2005).

\* cited by examiner

STORED SEARCHES

| SEARCH ID (63) | USER ID (64) | DEFAULT MESSAGE ID (66) | SEARCH STRING (66) | DATE LAST SEARCHED (68) | OTHER SEARCH PARAMETERS (70) |
|---|---|---|---|---|---|
| 0002 | 0101 | 00186 | XYZSTATION | 00/00/00 | NOT AUTHORIZED |

STORED SEARCH RESULTS

| RESULT ID (72) | ITEM ID (74) | DATE (76) | SEARCH ID (78) |
|---|---|---|---|
| 1010 | 2323 | 010100 | 0101 |

FROM FIG. 9A

```
ABC SEARCH ENGINE                  BANNER AD - CAT PRODUCT
   SEARCH     TERM   :   CAT
         ☐  BIGCATS.COM
         ☐  CAT RAGS
         ☐  SMALLCATS.COM
         ☒  SIAMESE CATS
         ☐  MYCAT.COM                                        172
         ☐  CATEPILLAR
         ☒  BENGAL CATS
         ☒  PERSIAN CATS                    280
                                       SAVE MY
         SELECT MORE    SEND        SELECTED SEARCH
  RECIPIENT NAME[        ]             RESULTS
  EMAIL ADDRESS(S) OF RECIPIENT(S) [XYZ@ABC.COM]
  MESSAGE    [            ]     USE      ☒
                               DEFAULT
  YOUR NAME  [            ]
  YOUR EMAIL ADDRESS  [ABC@XYZ.COM]
```

FIG. 12A

```
EMAIL (HTML)                      BANNER AD - CAT PRODUCT
TO: XYZ@ABC.COM
FROM: ABC@XYZ.COM                                             180

Hi <name>
  I thought you would be interested in the following *selected* results
  of a search I conducted using the ABC search engine.  Click on the
  links to view the page.
                                              REPLY
       ☒  SIAMESE CATS
                                         SEND TO FURTHER
       ☐  BENGAL CATS                        RECIPIENT ☐  PERSIAN CATS                  SAVE MY SELECTED
                                         SEARCH RESULTS
```

FIG. 12B

BANNER AD - CAT PRODUCT

ABC SEARCH ENGINE

TERM : CAT

OPTIONS 282 284 286 288

| | | | | |
|---|---|---|---|---|
| SEND ☐ | SAVE ☐ | SEND AND DELETE ☐ | DELETE ☒ | BIGCATS.COM |
| SEND ☐ | SAVE ☐ | SEND AND DELETE ☐ | DELETE ☒ | CAT RAGS |
| SEND ☐ | SAVE ☐ | SEND AND DELETE ☐ | DELETE ☒ | SMALLCATS.COM |
| SEND ☐ | SAVE ☒ | SEND AND DELETE ☐ | DELETE ☐ | SIAMESE CATS |
| SEND ☐ | SAVE ☐ | SEND AND DELETE ☐ | DELETE ☒ | MYCAT.COM |
| SEND ☐ | SAVE ☐ | SEND AND DELETE ☐ | DELETE ☒ | CATEPILLAR |
| SEND ☐ | SAVE ☒ | SEND AND DELETE ☐ | DELETE ☐ | BENGAL CATS |
| SEND ☐ | SAVE ☒ | SEND AND DELETE ☐ | DELETE ☐ | PERSIAN CATS |

SELECT MORE | SEND | SAVE MY SELECTED SEARCH RESULTS

RECIPIENT NAME [ ]
EMAIL ADDRESS(ES) OF RECIPIENT(S) [XYZ@ABC.COM]
MESSAGE [ ] USE DEFAULT ☒
YOUR NAME [ ]
YOUR EMAIL ADDRESS [ABC@XYZ.COM]

METHOD AND SYSTEM FOR COMMUNICATING USER INTERFACES BETWEEN FIRST AND SECOND USERS OVER A NETWORK

RELATED APPLICATIONS

The present application is a continuation of U.S. patent application Ser. No. 10/316,628 filed on Dec. 10, 2002 now U.S. Pat. No. 7,509,323, which is a continuation of U.S. patent application Ser. No. 09/668,399 filed on Sep. 22, 2000 and which issued as U.S. Pat. No. 6,523,037, which applications are incorporated herein by reference.

FIELD OF THE INVENTION

The present invention relates to the field of network-based communications and, more specifically, to a method of communicating a selected subset of data items between multiple users over a network, such as the Internet.

BACKGROUND OF THE INVENTION

The explosive growth of the Internet as a publication and interactive communication platform has seen parallel growth in the volume of resources and materials that may be accessed by the Internet. To enable users to navigate this unprecedented volume of information, a number of so-called "search engine" technologies have been developed and deployed under various brands. Widely deployed search engine technologies have been developed by Alta Vista, Inc., Inktomi, Inc., and Google, Incorporated. Internet search-engine features have been critical to the number of the major portals (e.g., Yahoo!, Incorporated and Excite) in attracting users to such portals.

Search engine technology is also widely deployed within the context of web sites, so as to allow visitors to a particular web site to locate documents or features that may be of interest. For example, a large number of corporate web sites that operate as major communication channels to customers typically employ search engine technology to allow a user to, for example, locate technical documents and articles pertaining to specific products.

The use of search engine technology is also widely evident in Internet-based electronic marketplaces or exchanges. Currently, such marketplaces are classified as being business-to-consumer (B2C), consumer-to-consumer (C2C), or business-to-business (B2B) according to the types of parties between which they facilitate transactions. In the context of a B2B exchange, a purchaser for a particular company may, via the online exchange, conduct a search of the inventories of suppliers, these inventories having been published by the relevant suppliers to the online exchange. Similarly, in the B2C and the C2C environments, a potential purchaser is enabled to search product offerings by multiple suppliers utilizing search engine technology employed by the relevant marketplace. One form of an electronic marketplace that has proved to be popular is the consumer-oriented online auction marketplace, where suppliers publish product or service offerings to be sold via an auction process. The publication of classified advertisements (e.g., via Yahoo! Classifieds) may also be classified as publishing to an online marketplace, where transactions are established.

The value of a search-engine technology within the context of such online marketplaces is particularly evident when one considers the number of products or services that are being offered by suppliers via such marketplaces. For example, on the popular online-auction facility developed and operated by Ebay, Incorporated of San Jose Calif., at any one time there may be between two and four million items or services available for receiving bids.

In order to bring a degree of automation to searching of the vast and ever-dynamic inventory available for purchase on an online marketplace, a number of such online marketplaces offer automated search features. Such automated search features typically allow the user to define search terms and conditions. The online marketplace will then, at scheduled times, automatically conduct a search utilizing the terms and conditions, and automatically communicate the results of these searches to the relevant user. In this way, the user can automatically be advised when items of interest to this user become available for purchase via the online marketplace.

Regardless of the context or environment within which an Internet-based search occurs, the results typically take the form of a list of hypertext (or linked) titles or descriptions presented in the context of a markup language document (e.g., HyperText Markup Language (HTML) document). To view further details regarding a particular "search hit", a user selects the hypertext title, responsive to which a resource to which the title is linked is invoked (e.g., a further HTML page may be displayed).

It often occurs that only a small percentage of a search result set is in fact of interest to the user.

BRIEF DESCRIPTION OF THE DRAWINGS

The present invention is illustrated by way of example and not limitation in the figures of the accompanying drawings, in which like references indicate similar elements and in which:

FIG. 3A illustrates an exemplary stored searches table.

FIG. 3B illustrates an exemplary stored search results table.

FIGS. 12A-12C illustrate a sequence of result set and subset interfaces that may be presented within the context of a web search facilitated by a web search engine.

FIG. 13 illustrates a further exemplary embodiment of a result set interface.

DETAILED DESCRIPTION

A method and system to communicate a selected search result set between first and second entities over a communications network are described. In the following description, for purposes of explanation, numerous specific details are set forth in order to provide a thorough understanding of the present invention. It will be evident, however, to one skilled in the art that the present invention may be practiced without these specific details.

Transaction Facility

Figure 1:
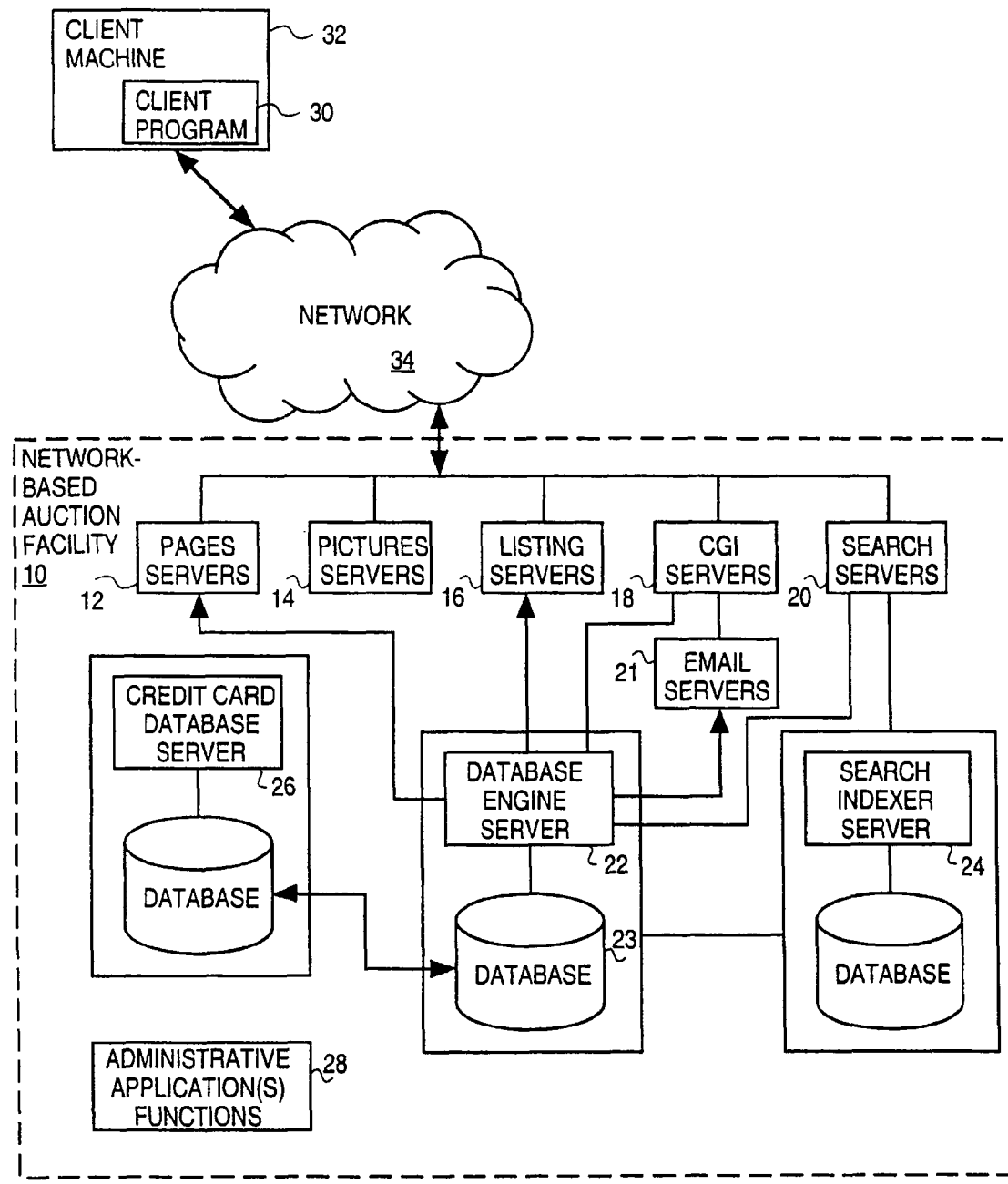
FIG. 1 is a block diagram illustrating an exemplary network-based transaction facility in the form of an internet-based auction facility.

FIG. 1 is block diagram illustrating an exemplary network-based transaction facility in the form of an Internet-based auction facility 10. While an exemplary embodiment of the present invention is described within the context of an auction facility, it will be appreciated by those skilled in the art that the invention will find application in many different types of computer-based, and network-based, commerce facilities.

The auction facility 10 includes one or more of a number of types of front-end servers, namely communications servers in the exemplary form of page servers 12 that deliver web pages (e.g., markup language documents), picture servers 14 that dynamically deliver images to be displayed within Web pages, listing servers 16, processing servers in the exemplary form of CGI (or ISAPI) servers 18 that provide an intelligent interface to the back-end of facility 10, and search servers 20 that handle search requests to the facility 10. E-mail servers 21 provide, inter alia, automated e-mail communications to users of the facility 10.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

Database Structure

Figure 2:
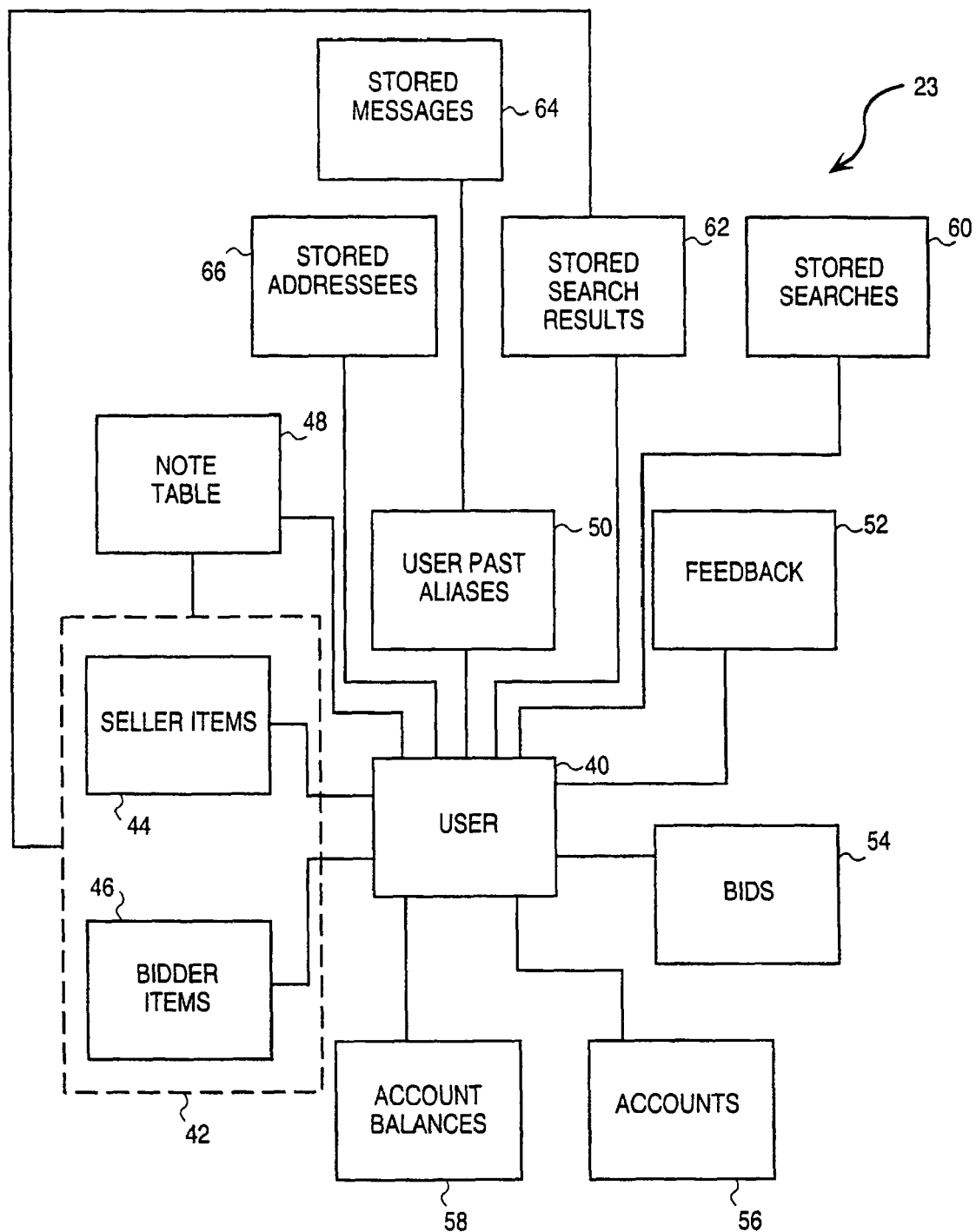
FIG. 2 is a database diagram illustrating an exemplary database, maintained by and accessed via a database engine server, which at least partially implements and supports the auction facility.

FIG. 2 is a database diagram illustrating an exemplary database 23, maintain by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

Central to the database 23 is a user table 40, which contains a record for each user of the auction facility 10. A user may operate as a seller, buyer, or both, within the auction facility 10. The database 23 also includes items tables 42 that may be linked to the user table 40. Specifically, the tables 42 include a seller items table 44 and a bidder items table 46. A user record in the user table 40 may be linked to multiple items that are being, or have been, auctioned via the facility 10. A link indicates whether the user is a seller or a bidder (or buyer) with respect to items for which records exist within the items tables 42.

The database 23 also includes a note table 48 populated with note records that may be linked to one or more item records within the items tables 42 and/or to one or more user records within the user table 40. Each note record within the table 48 may include, inter alia, a comment, description, history or other information pertaining to an item being auction via the auction facility 10, or to a user of the auction facility 10.

A number of other tables are also shown to be linked to the user table 40, namely a user past aliases table 50, a feedback table 52, a feedback details table 53, a bids table 54, an accounts table 56, and an account balances table 58.

The database 23 is also shown to include four tables specifically to enable an exemplary embodiment of the present invention. A stored searches table 60 stores records of the terms, parameters and conditions of searches that have been defined and saved by users for convenient recall, or for the purposes of having automated searches conducted by the search servers 20. A stored search results table 62 is constituted by a number of records, each record storing the result of a particular search conducted by, or for, a particular user. In the context of the present exemplary embodiment, the results of such a search may include a listing of items stored in the items tables 42.

A stored messages table 64 stores default and user-selectable messages, as specified by a user, to be communicated in conjunction with search results, or a subset of search results, according to the present invention. A stored addressees table 66 includes records for each of a collection of default or user-selectable addressees of messages embodying search results. Accordingly, the stored addressees table 66 may be utilized to support an online address book for a user.

FIG. 3A illustrates an exemplary embodiment of a stored searches table 60. A search identifier field 63 stores a unique identifier for each stored search record. A user identify field 65 stores an identifier for a user that conducted the search, and a default messenger identifier field 69 stores a key to a message stored within the stored messages table 64 and that should accompany a communication of the search results for the relevant search. A search string field 67 includes one or more search terms (or other conditions) that are utilized by the search servers 20 to located items of interest. A date last searched field 68 records the date and time on which the relevant stored search was last conducted. Another search parameters field 70 stores other conditions or parameters of fields that may be associated with a search (e.g., that the current search is not authorized or is disabled, etc.).

FIG. 3B illustrates an exemplary stored search results table 62. A result identifier field 72 stores a unique identifier for each stored set of search results. An item identifier field 74 stores an identifier that keys to the items table 42, and identifies a unique auction item that was located by a particular search. A date field 76 records a date on which the relevant search was conducted and search identifier field 78 keys to the stored searches table 60 to identify a search that generated the relevant result.

Methodology

Overview

Figure 4:
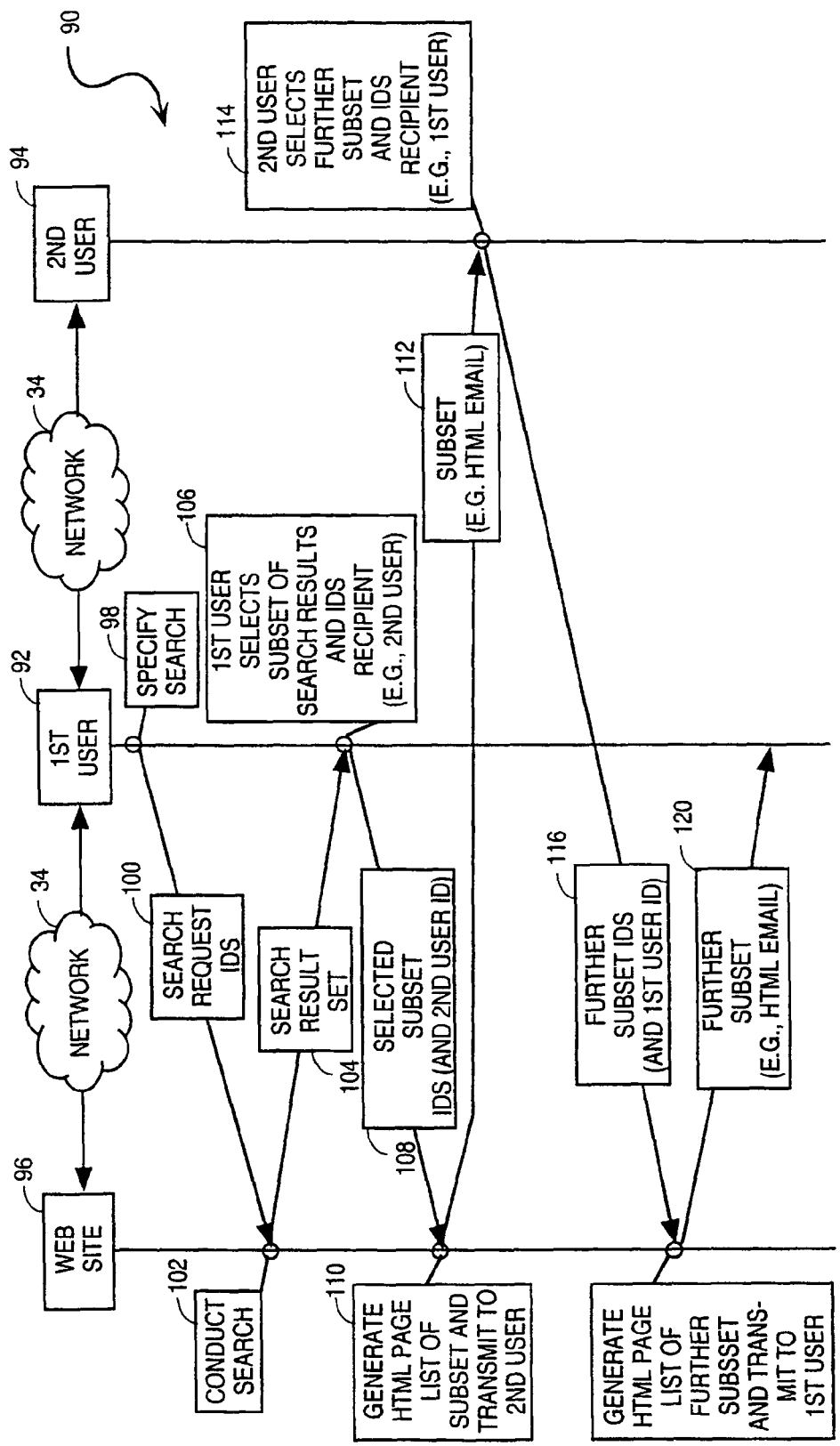
FIG. 4 is an interaction diagram illustrating a sequence of interactions, according to an exemplary embodiment of the present invention, to communicate search results between first and second entities.

FIG. 4 is an interaction diagram illustrating a sequence 90 of interactions, according to an exemplary embodiment of the present invention, to communicate search results between first and second entities in the exemplary form of first and second users 92 and 94. While the sequence 90 describes a client-server environment whereby communications between the first and second users 92 and 94 are facilitated by, or performed through, a web site 96, it will also be appreciated that the teachings of the present invention may be applied to a peer-to-peer environment whereby the first and second users communicate directly and not via a web site 96.

The sequence 90 commences at block 98 with the specification, by the first user 92 of a search (e.g., a Boolean text search). The specifications of the search may be, for example, performed by the input of a search terms into a form communicated to the first user from the web site 96.

At block 100, a search request is communicated from the first user 92 to the web site 96, for example, as an HTTP PUT request.

At block 102, the web site (e.g., the online auction facility 10) utilizes the search servers 20 to conduct a search to locate data items and to generate the result set of the data items. At block 104, the result set is then communicated back from the web site 96 to the first user 92, for example, in the form of a markup language document in which the result set is embodied. For example, the result set may comprise a list of hypertext links to data (e.g., documents) located by the search conducted at block 102.

At block 106, the first user 92 then selects a subset of the search result set by, for example, marking check boxes (or radio buttons) adjacent selected data items of the search result set. At block 108 the selected subset is then again communicated from the first user 92 to the web site 96 as, for example, an HTTP PUT request or as an e-mail. Further an identifier (e.g., an e-mail address), associated with the subset of search results, for the second user 94 may optionally be communicated to the web site 96 as part of the communication.

At block 110, the web site 96 generates a new markup language document that lists the subset of the search result. The page server 12 may populate a template with data items, or hypertext links to such data items. At block 112, the subset (e.g., as embedded within a markup language document) is communicated to the second user 94. Specifically, an HTML-based e-mail message may be communicated by the e-mail servers 21 to second user 94. In an alternative embodiment, a text e-mail message may be communicated at block 112, the text e-mail message including a Uniform Resource Locator (URL), or other location identifier, identifying a network location at which a markup document listing the subset of the search results may be retrieved by the second user 94.

At block 114, the second user may then select a further subset of search results, selected from the subset communicated at block 112, by selecting check boxes adjacent to such items that constitute the subset. The second user may also identify a recipient (e.g., first user 92) to which the further subset of search results is to be communicated.

At block 116, the first subset of search results is communicated from the second user 94 back to the web site 96. At block 118, the web site 96 then, in the same manner described above with reference to block 110, generates a markup language document listing the further subset of search results, what is then communicated to the first user at block 120.

While not mandatory, the first user 92 may then again select an even further subset of search results to be communicated to an indicated recipient (e.g., the second user 94). In this way, it will be appreciated that the sequence 90 facilitates the communications of an increasingly narrowed and more select subset of an initial search result between two or more entities. For example, where two entities are assessing the relevance of a search result set, the sequence might provide a convenient and user-friendly method by which an initial search result set may be narrowed to data items of that search result set which are of particular relevance, or may require particular action.

It should be noted that the sequence 90 may have any one of a number of applications and may be implemented within any number of environments. For example, the sequence 90 may be used to narrow the search result set of any of a number of online (or Internet-based) searches. Examples of such searches include any one of the searches typically offered by Yahoo! Incorporated (e.g., a web site, news, auction, classifieds, image, audio, product, business, and people searches to name but a few).

Figure 5:
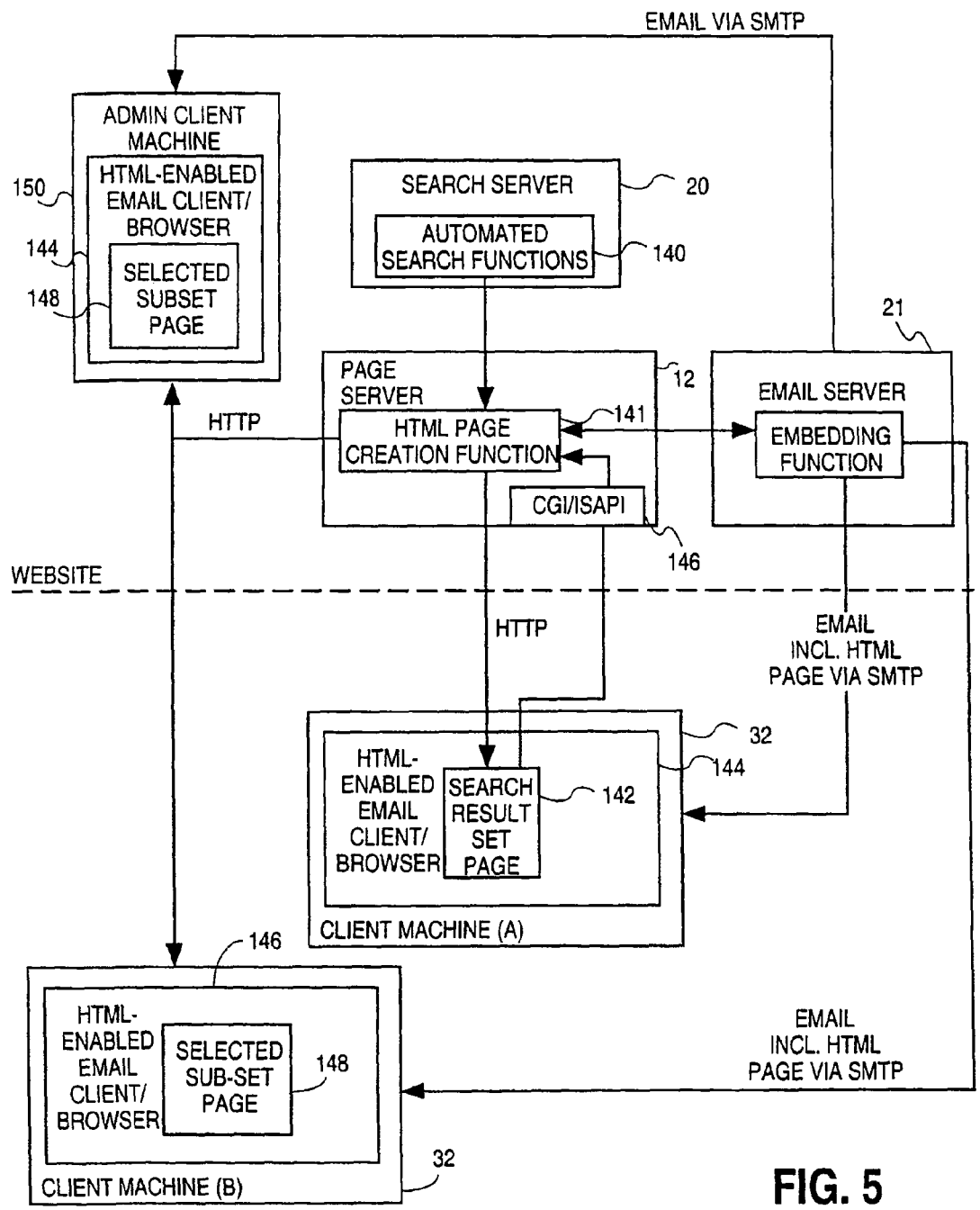
FIG. 5 is a block diagram illustrating an exemplary environment in which the interaction sequence illustrated in FIG. 4 may be employed.

FIG. 5 illustrates a specific exemplary environment within which the sequence 90 may be employed. Specifically, network-based auction facility 10, such as those operated by eBay, Incorporated, Yahoo! Incorporated and Amazon.com, may provide an automated "watching" service to users, whereby an automated search is periodically conducted to locate auction items of interest to the user, as identified utilizing user-specified search criteria. In addition to providing this automated "watching" service to a broad user base, the service may also be employed by companies and regulatory authorities to monitor network-based auction facilities 10 for irregular and illegal items. Such items may include, for example, copyright-infringing articles, unauthorized imitation products, and unauthorized utilization of trademarks. Further, regulative authorities may utilize the automated "watching" service to detect the attempted sale of illegal items such as drugs, firearms, etc.

When a user of the "watching" service receives automated notification of the existence of certain items that are up for auction via the auction facility 10, the user (e.g., a corporation or a regulatory authority) may wish to request that administrators of the auction facility 10 remove certain items from the facility 10. To this end, problematic items must be reported to administrators of the auction facility 10, who then perform an independent review of the relevant item, and remove the items as appropriate. The administrators are then typically required to report to the relevant monitoring user regarding whether or not the items have been removed.

It will be appreciated that where a large number of potentially problematic items are located by an automated watching service and communicated to a monitoring user (e.g., a company seeking to protect copyrights or trademarks), the identification of problematic items, and the communication of such identified items to the administrators of the auction facility 10 may be cumbersome and inconvenient. Typically, a monitoring user may be required to provide, verbally or by e-mail, item identifiers (e.g., item numbers) for each of the relevant items. This may require the monitoring user to perform a cut and paste of selected item numbers that are then communicated in an e-mail to an administrator. The administrator then typically will be required manually to input a relevant item number into an appropriate interface in order to retrieve the full details regarding an item. Where a large number of items are identified by a monitoring user as being potentially problematic, this back and forth process may be particularly time consuming and cumbersome.

FIG. 5 is a block diagram illustrating such an exemplary application of the sequence 90. Specifically, a search server 20 of a net-based auction facility 10 is shown to perform a number of automated search functions 140 to provide the above-discussed automated "watching" services and to generate a result set of items according to a specified search criteria. The result set may be communicated from the search server 20 to a page server 12 that generates a markup language document (e.g., an HTML page), for example, by populating a template with the result set to thereby generate a search result set page 142. The search result set page 142 may be an HTML document, or may be a text-based e-mail message that includes a network location identifier (e.g., URL) that identifies an HTML document embodying the search results. In FIG. 5, the search result set page 142 is shown to be communicated to an HTML-enabled e-mail client or browser 144 that executes in a client machine 32.

The search result set page 142 includes number of check boxes adjacent to each of the data items identifying the search result set. By checking the check boxes, the user is able to identify a subset of the search result set and to communicate the selected subset back to the page server 12 by selection of "submit" button presented within the search result set page 142. Specifically, the subset may be communicated as an e-mail message or an HTTP PUT request, or any utilizing any other transfer protocol or communication. The page server 12 executes a CGI script, or an ISAPI script, 146 that receives the communication of the subset of the search results, parses the communication to locate item identifiers (e.g., numeric or otherwise) embodied within the communication and communicates these identifiers to a page creation function 141. The page creation function 141 may then compose a new markup language document embodying the subset of the search result set.

The markup language document embodying the subset of search results may be communicated to a further user is one of two exemplary ways. In one embodiment, the page creation function 141 communicates a URL identifying the created page to any e-mail server 21, which composes a text-based e-mail message that is then communicated from the e-mail server 21 to a client machine 34 of a targeted user. In this case, utilizing the URL embedded in the e-mail message, the user of the client machine 34 may access the created markup language document utilizing a browser application.

In an alternative embodiment, the page creation function 141 may communicate a markup language document to the e-mail server, which embeds the markup language document in an e-mail message. The e-mail message is then communicated to an HTML-enabled client 144 executing on the client machine 34, utilizing which the user of the client machine 34 may view the markup language document. This markup language document is indicated in FIG. 5 as being the selected subset page 148.

In FIG. 5, client machines 32 are shown to reside outside the context of a web site. Accordingly this embodiment describes an application which allows a first user of a client machine 32 (e.g., client machine (A)) to communicate a subset of search results to a user of a further client machine 32 (e.g., client machine (B)), both of which reside outside a web site or commerce facility.

An alternative application would allow the user of a client machine 32 to communicate the select subset search results of the search results to a administrator of a commerce facility (or web site) that utilizes an administrator client machine 150. In this case, an e-mail (e.g., a text-based or HTML-based e-mail message) is sent to the administrative client machine 150 conveniently to communicate the auction items that are considered by the user of client machine 32 to be potentially problematic to the administrator. Further, as the subset page 148 is a markup language page document providing a listing of the auction items as hypertext, the administrator may also conveniently be able to select appropriate hypertext to invoke a full description of the relevant auction item, and is in this way spared the effort of manually inserting identifiers for auction items that have been identified by a monitoring user.

Figure 6:
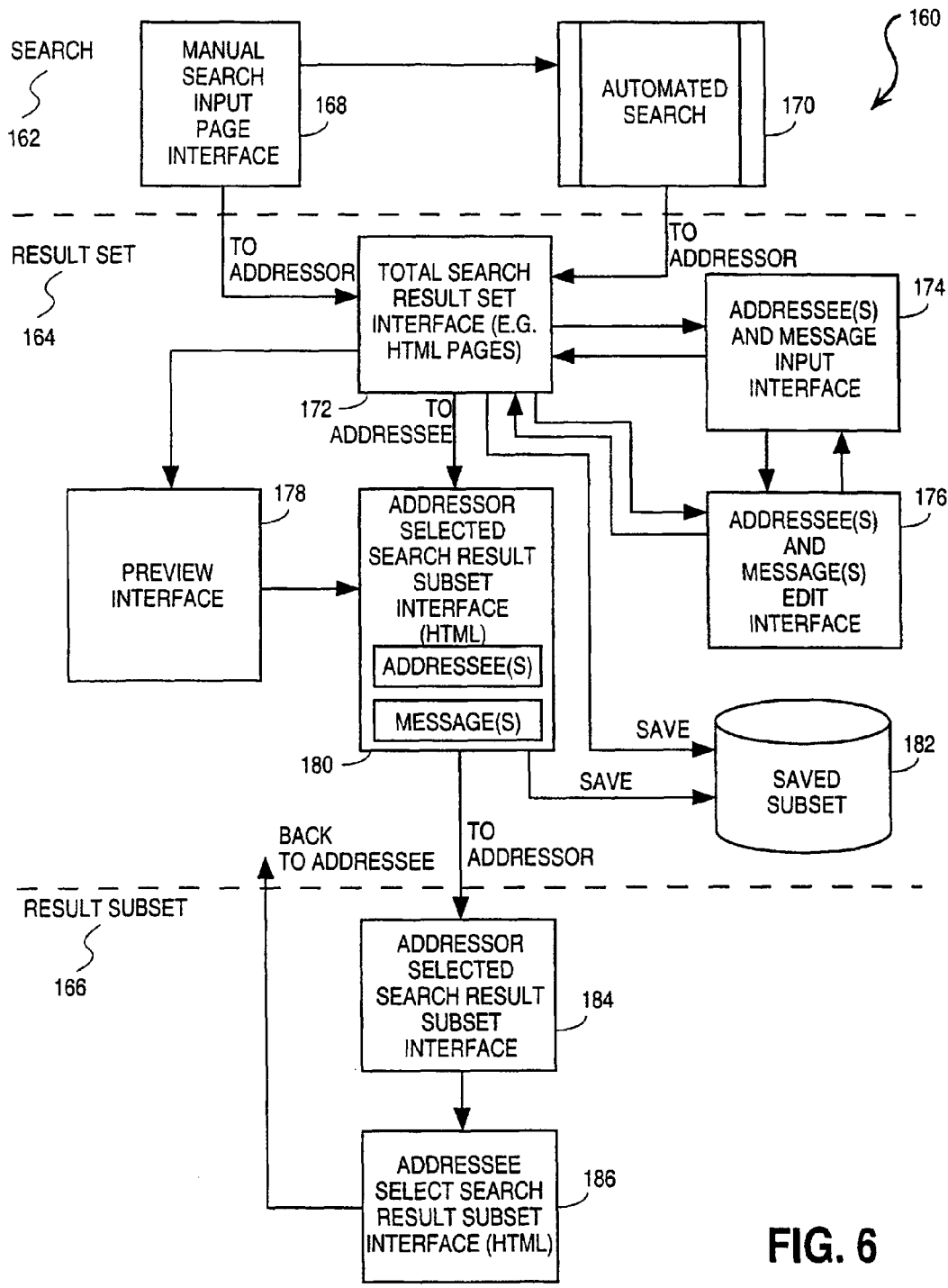
FIG. 6 is an interface map illustrating a collection of interfaces, according to an exemplary embodiment of the present invention, that may be presented to facilitate communication of search results between entities.

FIG. 6 is an interface map 160, according to an exemplary embodiment of the present invention, illustrating a collection of interfaces that may be presented to entities (e.g., a users or administrators) to facilitate the communication of search results between such entities. The interfaces are furthermore categorized as comprising a search interfaces 162, result set interfaces 164 and result subset interfaces 166.

A first user may be presented with a manual search input page interface 168 that facilitates the input and specification of search criteria. The input into the interface 168 may, in one embodiment, be stored as an automated search 170.

Regardless of whether a search is conducted as a result of a specific, unique search request inputted into interface 168, or as automated search 170, a search result set is presented in a result set interface 172. In one embodiment, the result set interface 172 comprises a markup language document in the form of an HTML page that lists a descriptor for each of the search results, each descriptor comprising hypertext linked to a document.

Each descriptor may furthermore be displayed adjacent a check box, which is used-selectable to mark a data item to be included within a subset of the search results to be communicated to a further entity. The interface 172 further presents a "submit" or "send" button that is user-selectable to communicate the select subset, together with a default message, to a default addressee.

An addressee and message selection input interface 174 is also accessible from the result set interface 172. Utilizing the interface 174, an addressor entity may chose from a number of pre-defined messages to accompany the subset of the result set, and also specify one or more addressees.

An addressee and message edit interface 176 is also accessible from either the result set interface 172 or the input interface 174. Utilizing the interface 176, an addressor user may edit a list of potential addressees, and also edit or author messages presented for selection in the input interface 174.

A preview interface 178 is accessible from the result set 172, and allows an addressor to preview the subset and messages to be communicated to the addressee. For example, the preview interface 178 may present the HTML page that includes hypertext descriptors of the data items of the search result subset.

A subset interface 180 is then presented to the addressor for review. The interface 180 includes hypertext descriptors of the data items of the search result subset and may also include a listing of one or more addressees and a message to accompany the result subset (e.g., the default or user-specified message).

The selected search result may also be saved as a saved subset 182 from either the search result set interface 172 or by performing an appropriate user-selection within the subset interface 180.

The search result subset, as described within the exemplary context of an HTML document, is then communicated to the addressee as a result subset interface 180 that is viewable by the addressee. The result subset interface 180, as described above, may include descriptors for each of the data items of the subset, each descriptor comprising hypertext. Accordingly, user selection of the hypertext may conveniently cause a retrieval of a full document included in the result subset. Further, each of the descriptors presented within the result subset interface 180 may also be presented in association with a check box to facilitate addressee selection from within the subset. Utilizing the check boxes, this addressee may then define a narrowed subset of the search result set, and utilizing interfaces substantially similar to those described above, communicate this narrowed subset back to the original addressor, or to further addressees. This narrowed subset of the search results may again be listed within the context of a subset interface 186 that includes a message appropriate to the narrowed subset.

Figure 7:
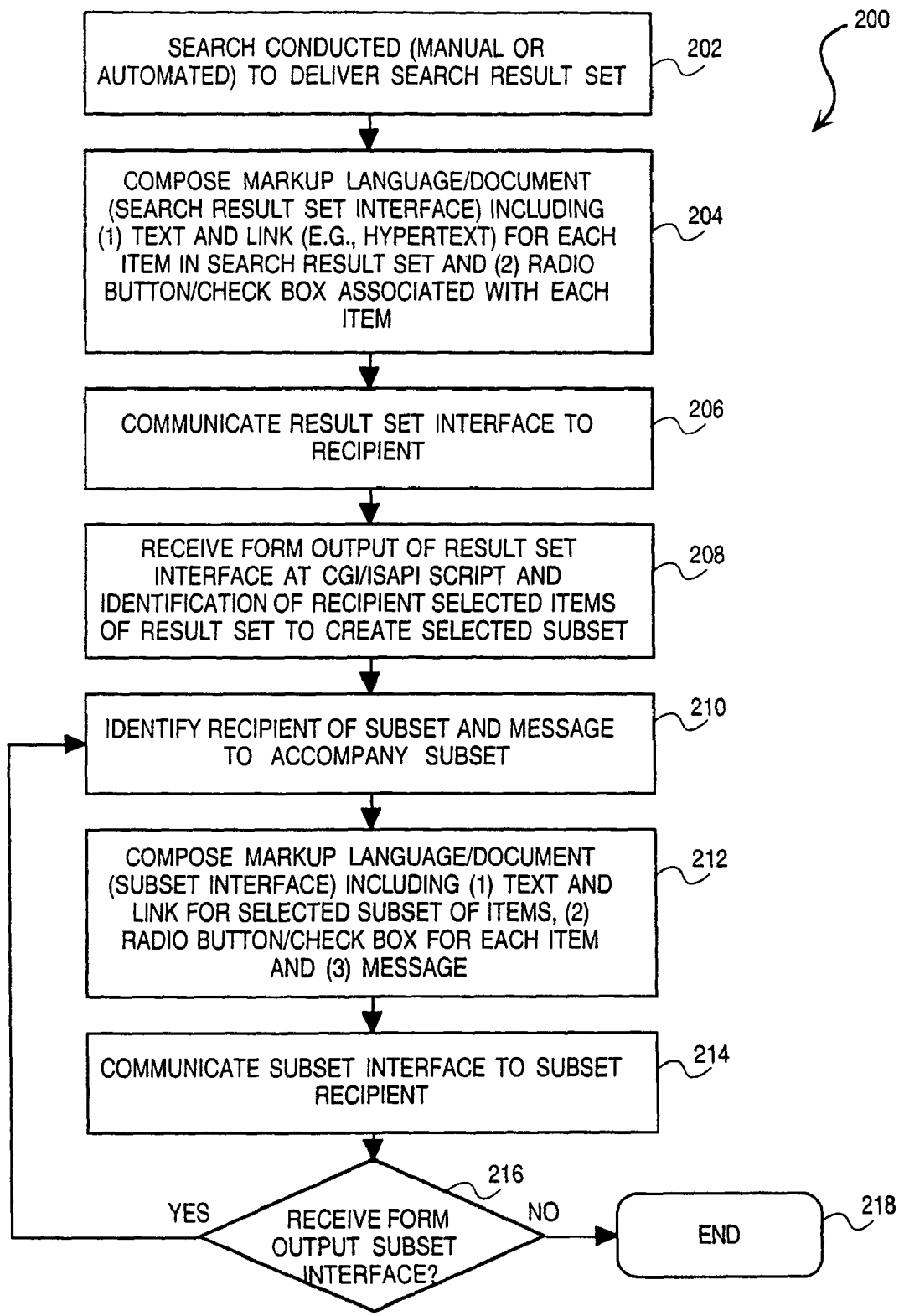
FIG. 7 is a flow chart illustrating a method, according to an exemplary embodiment of the present invention, of communicating search results between first and second entities.

FIG. 7 is a flow chart illustrating a method 200, according to an exemplary embodiment of the present invention, of communicating search results between first and second entities. It will be appreciated that the method 200 may, as described above, be utilized to communicate search results as a result of any search operation, and is not limited to the context of a network-based auction facility.

The method 200 commences at block 202 with the performance of a manual or automated search to deliver a search result set. The search result set is constituted by, for example, multiple data items (e.g., text, video, or audio data). The search may be conducted by the search server 20.

At block 204, a search result set interface 172, in an exemplary form of a markup language document, is composed to include a respective textual description (or a visual representation) for each item of the search result set. The descriptive text, in one embodiment, comprises hypertext that is user-selectable to retrieve and access the respective data item. The search result set interface 172 facilitates a user-selection mechanism whereby a user may select one of more of the data items of the result set. In the exemplary embodiment, this is facilitated by the provision of check boxes (or radio buttons) adjacent each textual description, thus to be associated with the relevant description. In an exemplary embodiment, the search result set interface 172 is composed by the page server 12.

At block 206, the result set interface 172 is communicated to the search recipient, for example as an HTML-formatted e-mail message. The communication of the result set interface 172 is, in one embodiment, performed by the e-mail server 21.

At block 208, a form output of the result set interface 172 is received, together with identification of an indicated subset recipient (or addressee). Specifically, the output of the result set interface comprises a subset of the result set. In one exemplary embodiment, the form output is received by a CGI or ISAPI script executed by the page server 12.

At block 201, the indicated recipient (or addressee) of the subset is identified, and a message (default or otherwise indicated) is identified to accompany the communication of the result search subset to the subset recipient.

At block 201, the subset interface 180, in the exemplary embodiment form of a markup language document, is composed to include a textual description (or other visually indicator) for each of the items of the subset, the textual descriptions providing links to the actual data items. The subset interface 180 enables a user-selection mechanism for each textual description (e.g., a check box of radio button), and also includes a message (default or user-selected) to accompany the subset of the search results to the subset recipient (or addressee). Again, in one exemplary embodiment, the subset interface 184 may be composed by the page server 12.

At block 214, the subset interface 180 is communicated, for example as an HTML-formatted e-mail communication, to the subset recipient. In one exemplary embodiment, the communication at block 214 is performed by the e-mail server 21.

At decision block 216, a determination is made as to whether a further, possibly narrowed subset is received, for example, at the page server 212. If not, the method 200 then terminates at block 218. Alternatively, should the subset recipient (or addressee) communicate a reduced subset of the search results, selected from the subset communicated at block 214, the method 200 loops back to block 210, and a further subset interface 186 may be generated, in the manner described above, for delivery to an indicated recipient (e.g., the original addressor) of such a further subset.

It will be appreciated that the method 200 may loop through blocks 210-216 to achieve the communication of a continually narrowed, reduced subset of the original result set between two or more entities.

Exemplary Embodiment

Network-Based Auction Facility

Figure 8:
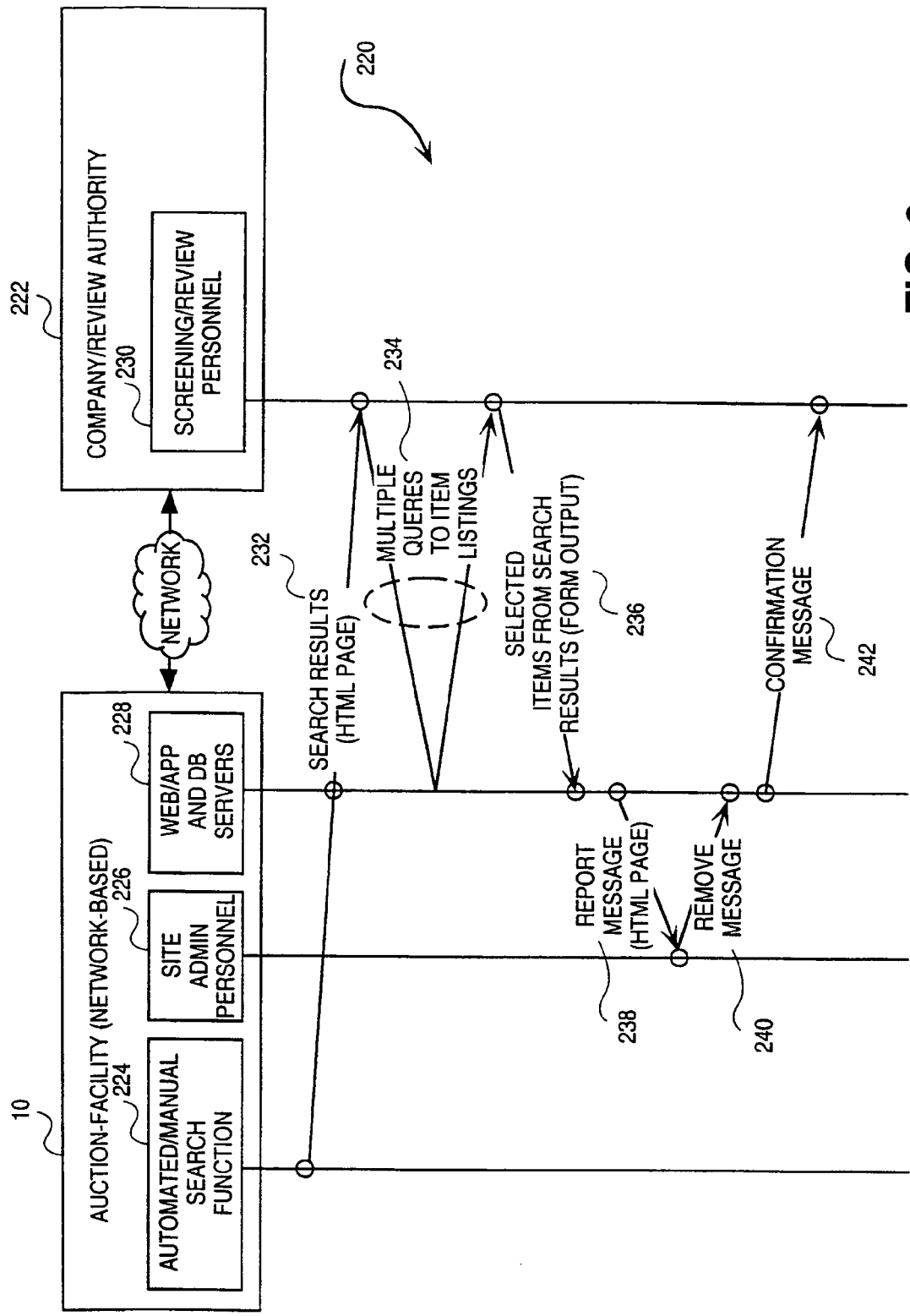
FIG. 8 is an interaction diagram illustrating an interaction sequence, according to an exemplary embodiment of the present invention, by which search results may be communicated between a network-based auction facility and a reviewing authority.

FIG. 8 is an interaction diagram illustrating an interaction sequence 220, according to an exemplary embodiment of the present invention, by which search result may be communicated between a network-based auction facility 10 and a company or reviewer authority 222 that desires to monitor items being auctioned via the auction facility 10.

To this end, the auction facility 10 is shown to include an automated or manual search function 224, site administration personnel 226, and a collection of web, application, and/or database server 228. The company, or reviewing authority, 222, is shown to employ screening or review personnel 230.

As illustrated, at 232, search results, comprising a search result set, are communicated from the search function 224, via the servers 228, to the screening or review personnel 230. The search results are communicated as an HTML-formatted e-mail, or as an HTML document.

At 234, the personnel 230 are able, by selecting hypertext links associated with each data item constituting the search results, to make multiple queries to item listings, the queries being responded to by the servers 228 of the auction facility 10.

Having then reviewed the result set, the personnel 230 communicate selected items (a subset) of the result set to the servers 228. In one embodiment, the personnel may select the data items using check boxes, in the manner described above. In this case the communication may take the form of an HTML form output.

At 238, the server 228, utilizing the identification of the selected items, generates a report message, for example in the form of an HTML page, that is delivered to the site administration personnel 226. It will be appreciated that the personnel 226 may, as described above with reference to the multiple queries at 234, perform multiple queries against the item listings to ascertain whether a request of the company or review authority 222 to remove items from the auction facility 10 is warranted or not.

At 240 the site administration personnel 226 issue a remove message 240 to the servers 228 to effect the removal of certain items, from among the selected items, from the auction facility 10.

As 242, the servers 228 automatically generate a confirmation message to the screening or review personnel 230, confirming the removal of certain of the selected items from the auction facility 10 or possibly communicating reasons for the retention of certain of these selected items on the auction facility 10.

Figure 9A:
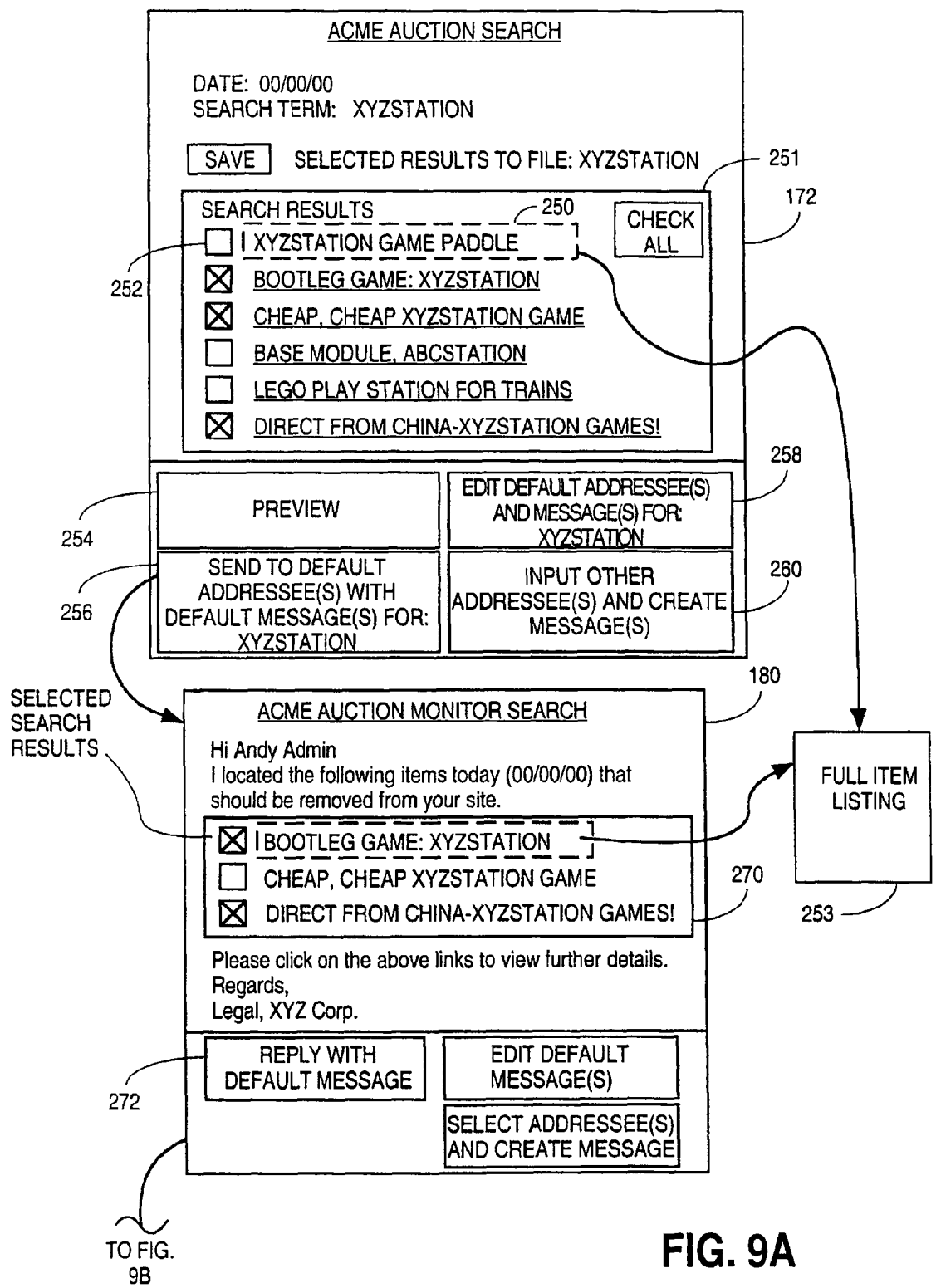
FIGS. 9-11 illustrate exemplary embodiments of various interfaces that may be generated by a web server to facilitate the communication of selected search results between entities.
Figure 9B:
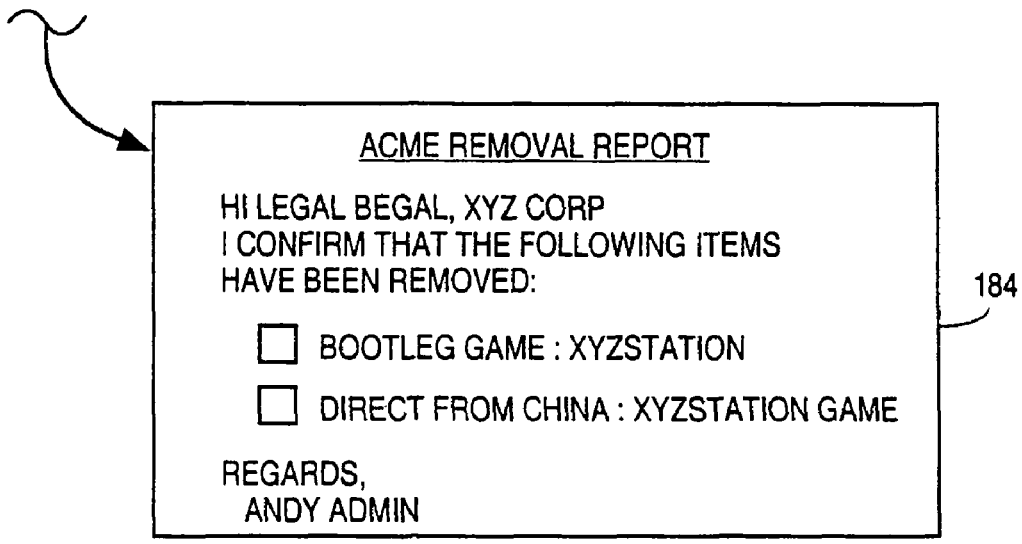
Figure 10:
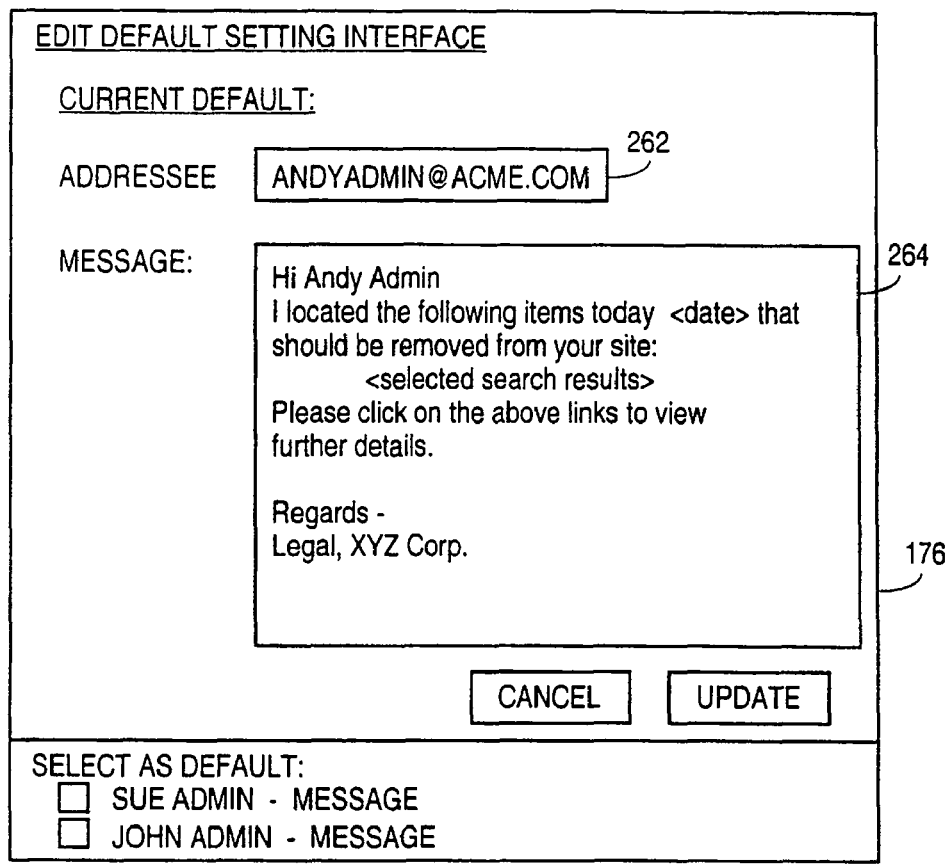
Figure 11:
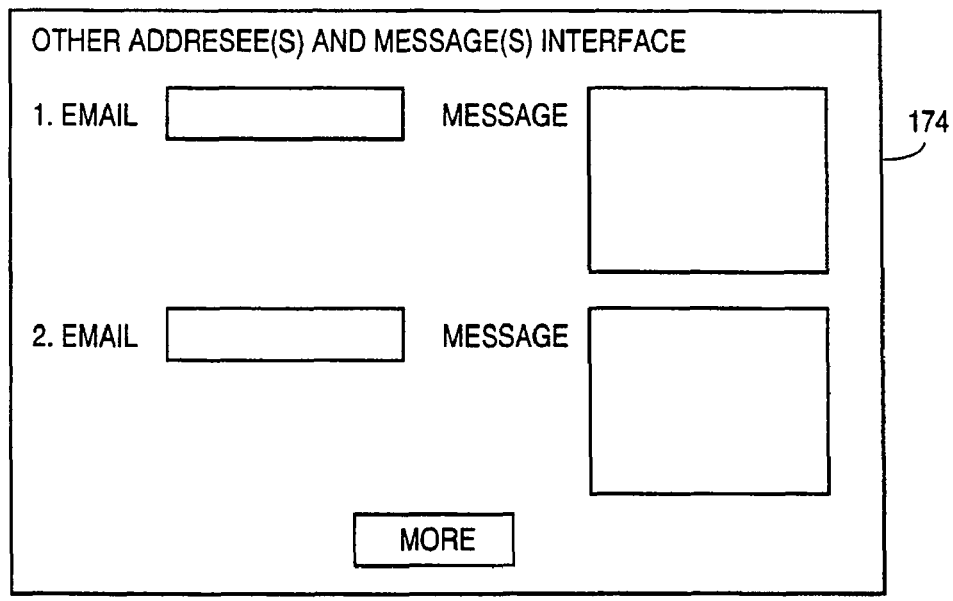

FIGS. 9-11 illustrates exemplary embodiments of the various interfaces discussed above, these exemplary embodiments constituting HTML pages that may be generated by a web server.

Referring to FIG. 9A, the exemplary result set interface 170 is shown to include a number of textual descriptions 250, in the form of hypertext, each textual description 250 having a check box associated therewith that screening or review personnel 230 may check to indicate user-selection of the relevant item. The interface 172 also includes a user-selectable preview button 254 utilizing which personnel 230 may invoke a preview of the result subset interface 180.

A default button 256 is user-selectable to cause the communication of the selected subset of the result set 251 to a default addressee (of addressees) with a default message. An edit button 258 is used-selectable to invoke the address and message edit interface 176 whereby the user might edit default addressee or message specifications. An input button 260 is user-selectable to invoke the addressee and message selection input interface 174 whereby the user may input addressee or messages details.

FIG. 10 illustrates an exemplary addressee and message edit interface 176. The interface 176, in an addressee field 262, displays a default addressee to receive the selected subset of a search result set. Similarly, a message field 264 contains the text of a default message to be communicated to the identified addressee. In the exemplary embodiment, the addressee is indicated to be a member if the site administration personnel 226, and the default message is shown to constitute a request that the items constituting the subset be removed from the on-line auction facility 10. The interface 176 also presents a number of stored addressees that may be selected as default addressees.

FIG. 11 illustrates an exemplary embodiment of an addressee and message input interface 174, whereby the e-mail addresses for the addressees and custom messages may be specified.

Returning to FIG. 9A, an exemplary subset interface 180 is shown to include the text of a message (e.g., a default message), as well as a subset 270 of selected search results. It will be noted that the subset 270 is indicated by textual descriptions for those items for which the review personnel 230 marked check boxes within the result set interface 172. The textual descriptions of the subset of search results are again hypertext, which is user-selectable to invoke a full item listing 253 for the relevant data item. Further, the textual descriptions for the subset 270 are again presented in association with check boxes utilizing which an administrator may select data items for To this end, the interface 180 is shown to include a reply button 272 that is user-selectable to reply to screening or review personnel 230 with a default message and a further subset of the result set 251.

An example of a further subset interface 186, as may be presented to the screening and review personnel 230, is shown in FIG. 9B.

Exemplary Embodiment

Web Search

Figure 12C:
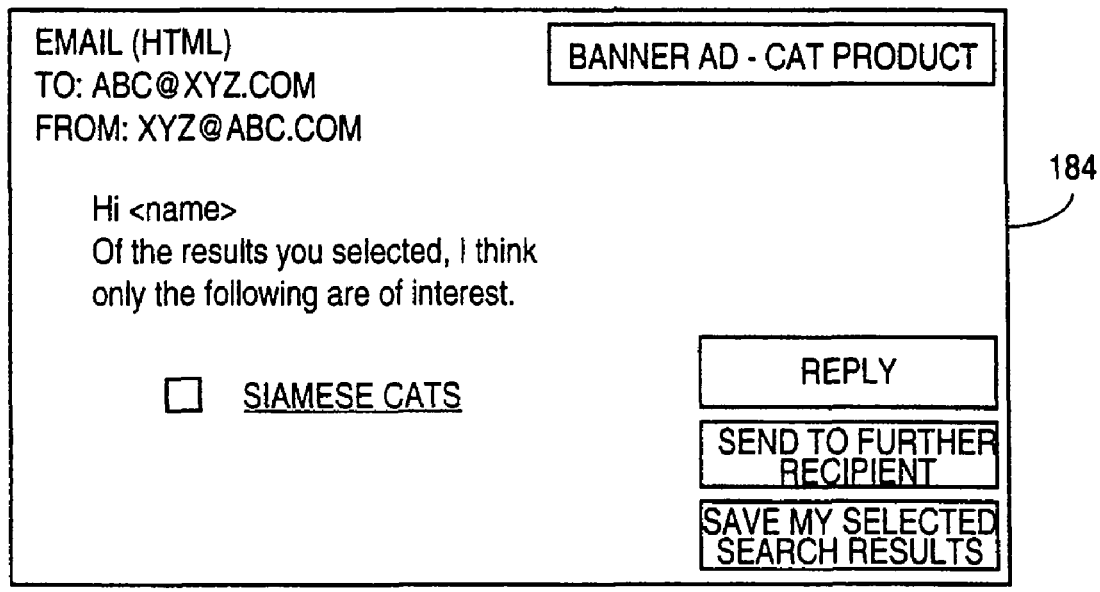

FIGS. 12A-12C illustrates a sequence of result set and subset interfaces 172, 180 and 184 that may be presented within the context of a web search facilitated by any one of a number a well-known web search engines, such as Yahoo! or Google. The interfaces present similar functionality and features to those discussed above with reference to FIGS. 9A and 9B. It will however be noted that the result subset interface 172 includes a save button 280 that is user-selectable to save a selected subset of the search results as a saved subset 182.

FIG. 13 illustrates yet a further exemplary embodiment of the result set interface 172, whereby each data item is represented with a hypertext textual description and associated with respective send, save, send and delete, and delete check boxes 282, 284, 286, 288 that are user-selectable to specify a user-specified action with respect to each of the items of the search result set.

Computer System

Figure 14:
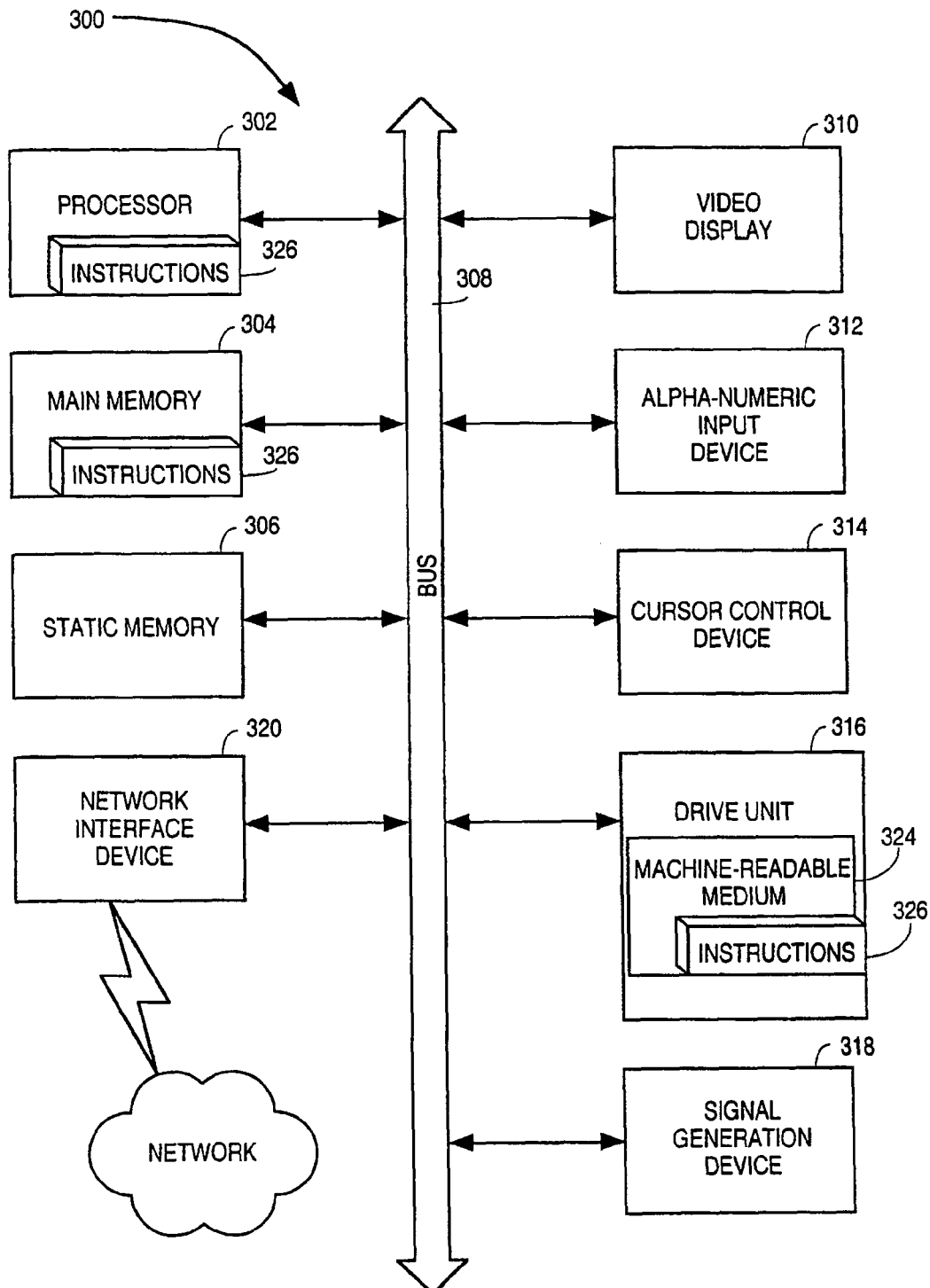
FIG. 14 is a diagrammatic representation of a machine in the exemplary form of a computer system within which a set of instructions may be executed.

FIG. 14 shows a diagrammatic representation of a machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alpha-numeric input device 312 (e.g., a keyboard), a cursor control device 314 (e.g., a mouse), a disk drive unit 316, a signal generation device 18 (e.g., a speaker) and a network interface device 320

The disk drive unit 316 includes a machine-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 320. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to include, but not be limited to, solid-state memories, optical disks and magnetic disks.

Thus, a method and system to communicate selected search results between first and second entities over a communications network have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method including:
   generating a first user interface including a first plurality of items and a first plurality of selection functions, the first plurality of items respectively being associated with the first plurality of selection function, the generating utilizing at least one processor;
   presenting the first user interface to a first user over a communications network;
   receiving a plurality of selections from the first user that identify a second plurality of items, the second plurality of items having been selected from the first plurality of items by the first user using the first plurality of selection functions, the receiving utilizing at least one processor;

generating a second user interface including the second plurality of items and a second plurality of selection functions, the second plurality of items respectively being associated with the second plurality of selection functions;

presenting the second user interface to the second user;

receiving a plurality of selections from the second user that identify a third plurality of items, the third plurality of items having been selected from the second plurality of items by the second user using the second plurality of selection functions;

generating a third user interface including the third plurality of items and a third plurality of selection functions, the third plurality of items respectively being associated with the third plurality of selection functions; and presenting the third user interface to the first user.

2. The method of claim 1, wherein the first plurality of items is generated in response to at least one of a search input or an automated search.

3. The method of claim 1, wherein the first user interface is a markup language document.

4. The method of claim 3, wherein the markup language document includes a plurality of links respectively associated with a plurality of listings.

5. The method of claim 1, wherein the first user interface includes a textual description of a first item included in the first plurality of items.

6. The method of claim 5, wherein the first user interface includes a visual representation of the first item.

7. The method of claim 1, wherein the first plurality of selection functions includes a first selection function that is selected from a group of selection functions consisting of a radio button and a checkbox.

8. The method of claim 1, further including receiving a message that includes an address of the second user.

9. The method of claim 8, wherein the message is selected from a message group consisting of a default message, an edited default message and a created message.

10. The method of claim 8, wherein the address is selected from an address group consisting of a default address, an edited default address and an input address.

11. A machine-readable medium storing a sequence of instructions that, when executed by a machine that includes at least one processor, causes the machine to:

generate a first user interface that includes a first plurality of items and a first plurality of selection functions, the first plurality of items respectively associated with the first plurality of selection functions;

present the user interface to a first user over a communications network;

receive a first plurality of selections from the first user that identifies a second plurality of items, the second plurality of items having been selected from the first plurality of items by the first user using the first plurality of selection functions;

generate a second user interface that includes the second plurality of items and a second plurality of selection functions, the second plurality of items respectively associated with the second plurality of selection functions;

present the second user interface to the second user;

receive a plurality of selections from the second user of a third plurality of items, the third plurality of items having been selected from the second plurality of items by the second user using the second plurality of selection functions;

generate a third user interface that includes the third plurality of items and a third plurality of selection functions, the third plurality of items respectively associated with the third plurality of selection functions; and present the third user interface to the first user.

* * * * *